United States Patent
Murakoshi et al.

(10) Patent No.: US 6,850,971 B1
(45) Date of Patent: Feb. 1, 2005

(54) SYSTEM FOR PROCESSING INFORMATION WHICH READS ADDRESS INFORMATION

(75) Inventors: Sho Murakoshi, Saitama-ken (JP); Hiroaki Shibuki, Saitama-ken (JP); Hidemi Usuba, Saitama-ken (JP); Shinsuke Nishimura, Saitama-ken (JP); Keiichi Yamauchi, Saitama-ken (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 08/990,981

(22) Filed: Dec. 15, 1997

(30) Foreign Application Priority Data

Feb. 18, 1997 (JP) ............................................. 9-034127
Feb. 18, 1997 (JP) ............................................. 9-034128

(51) Int. Cl.[7] ............................................. G06F 15/16
(52) U.S. Cl. ........................ 709/217; 709/203; 709/245
(58) Field of Search .............................. 369/34, 32, 58, 369/54, 47, 94, 30.28; 709/217, 218, 202, 242, 245; 345/719; 707/1

(56) References Cited

U.S. PATENT DOCUMENTS

| | | | | |
|---|---|---|---|---|
| 5,228,021 A | * | 7/1993 | Sato et al. ..................... 369/58 |
| 5,430,553 A | * | 7/1995 | Misono et al. ............... 358/342 |
| 5,446,714 A | * | 8/1995 | Yoshio et al. .................. 369/48 |
| 5,553,289 A | * | 9/1996 | Johnson et al. ............. 395/154 |
| 5,633,842 A | * | 5/1997 | Hishida et al. ................ 369/58 |
| 5,726,957 A | * | 3/1998 | Hisamatsu et al. ............ 369/58 |
| 5,778,181 A | * | 7/1998 | Hidary et al. ................ 709/218 |
| 5,804,803 A | * | 9/1998 | Cragun et al. .................. 707/1 |
| 5,905,521 A | * | 5/1999 | Gatto et al. .................. 345/719 |
| 5,930,474 A | * | 7/1999 | Dunworth et al. ..... 395/200.47 |
| 5,956,038 A | * | 9/1999 | Rekimoto .................... 345/419 |
| 5,991,798 A | * | 11/1999 | Ozaki et al. ................. 709/217 |
| 6,031,795 A | * | 2/2000 | Wehmeyer ............... 369/30.28 |
| 6,047,376 A | * | 4/2000 | Hosoe ........................ 713/201 |
| 6,055,565 A | * | 4/2000 | Inai ............................ 709/218 |
| 6,076,103 A | * | 6/2000 | Sakai .......................... 709/217 |
| 6,101,534 A | * | 8/2000 | Rothschild .................. 709/217 |
| 6,128,652 A | * | 10/2000 | Toh et al. .................... 709/219 |
| 6,498,775 B1 | * | 12/2002 | Fan et al. ...................... 369/94 |

* cited by examiner

Primary Examiner—Paul H. Kang
(74) Attorney, Agent, or Firm—Arent Fox PLLC

(57) ABSTRACT

A medium is set in a computer, and identification information of the set medium is read out. Related information about the medium is obtained in accordance with the identification information read from the medium. The obtained related information is displayed on a display.

4 Claims, 10 Drawing Sheets

FIG.6

RETRIEVAL TABLE

| | | |
|---|---|---|
| | IDENTIFICATION INFORMATION 1 | KEYWORD 1 |
| | IDENTIFICATION INFORMATION 1 | KEYWORD 2 |
| | | |
| | ⋮ | ⋮ |
| | IDENTIFICATION INFORMATION 2 | KEYWORD 3 |
| CD-EXTRA | IDENTIFICATION INFORMATION 3 | KEYWORD 3 |
| | ⋮ | ⋮ |
| | | |

FIG.7

RETRIEVAL TABLE

| KEYWORD 1 | ADDRESS 1 |
|-----------|-----------|
| KEYWORD 1 | ADDRESS 2 |
| KEYWORD 2 | ADDRESS 3 |
| KEYWORD 3 | ADDRESS 3 |
|           |           |

FIG.10

RETRIEVAL TABLE

| | | |
|---|---|---|
| CD–AUDIO | IDENTIFICATION INFORMATION 1 | ADDRESS 1 |
| | IDENTIFICATION INFORMATION 1 | ADDRESS 2 |
| | ⋮ | ⋮ |
| CD–EXTRA | IDENTIFICATION INFORMATION 2 | ADDRESS 3 |
| | IDENTIFICATION INFORMATION 3 | ADDRESS 3 |
| | ⋮ | ⋮ |

SYSTEM FOR PROCESSING INFORMATION WHICH READS ADDRESS INFORMATION

BACKGROUND OF THE INVENTION

The present invention relates to a computer, and more particularly to a computer for a reproducing medium having a function for indicating related information of the reproducing medium.

Recently, various types of information reproducing media using CD (compact disc) media come into the market. The CD was generally used as a CD audio disc at first. Nowadays, the CD-ROM is popular mainly for a computer. The CD-ROM includes the photo-CD, enhanced music CD (hereinafter called CD-extra) and video-CD. Particularly, the CD-extra and photo-CD are also included in the multi-session CD having a plurality of sessions. In each session, a lead-in area and a lead-out area are provided.

Furthermore, recently, the personal computer has been improved to have reproducing programs for reproducing not only the photo-CD and video-CD, but also have reproducing programs for the CD-Audio so as to reproduce the music CD.

On the other hand, the personal computer has come to be communicated with external equipments through networks for easily exchanging information each other. For example, in the Internet, a user activates a browser and input an address of a server which has desired information so as to freely access the server.

There is a server having a function to retrieve the address by a keyword. Therefore, even if a desired address is not known directly, if the user accesses the server having the retrieval function, the desired address can be obtained indirectly by the server.

For a high speed process, it is possible to activate a plurality of programs in time sharing and operate a plurality of functions in parallel. For example, a reproducing program and a browser program of a music CD are activated in parallel, and the music CD is played, while related information of the music CD such as title of the CD, name of music can be displayed on a display.

However, in this case, first the user must presume one of keywords of the related information such as a name of singer of the music CD to be played, and operate to activate the browser of the personal computer by the presumed keyword, thereby obtaining an address of the related information from the server having the retrieval function. Therefore, the related information is obtained by the address. Thus, a problem that a complicated operation is needed arise.

SUMMARY OF THE INVENTION

An object of the present invention is to provide a computer for a reproducing medium where related information of the reproducing medium is automatically indicated when the reproducing medium is set in the computer.

According to the present invention, there is provided a computer for a reproducing medium, comprising reading means for reading identification information from a medium set in the computer for identifying the medium, means for obtaining related information about the medium in accordance with the identification information read from the medium, and control means for controlling displaying of the obtained related information on a display.

The computer has storing means storing addresses of the related information, and obtaining means for obtaining related information from a server which has the related information corresponding to the address, and a program for displaying obtained related information.

In an aspect of the invention, the related information is stored in a medium other than the set medium, and the related information stored in the other medium is read and stored in the computer.

The related information corresponding to the identification is obtained from a server.

The computer further has manual input means for correlating the obtained related information with an address and storing the correlated information.

The computer further comprises means for transmitting the identification information to a server so that corresponding related information is obtained.

Retrieving means is provided for retrieving addresses of related information corresponding to the identification information.

The present invention further provides a computer for a reproducing medium, comprising reading means for reading address of related information from a medium set in the computer, means for obtaining related information corresponding to the read-out address, and control means for controlling displaying of the obtained related information on a display.

These and other objects and features of the present invention will become more apparent from the following detailed description with reference to the accompanying drawings.

BRIEF DESCRIPTION OF DRAWINGS

FIG. 6 is a schematic diagram showing a retrieval table stored in the computer;

FIG. 7 is a schematic diagram showing another retrieval table in the computer;

FIG. 10 is a schematic diagram showing a further retrieval table in the computer;

DETAILED DESCRIPTION OF THE PREFERRED EMBODIMENTS

Figure 1:
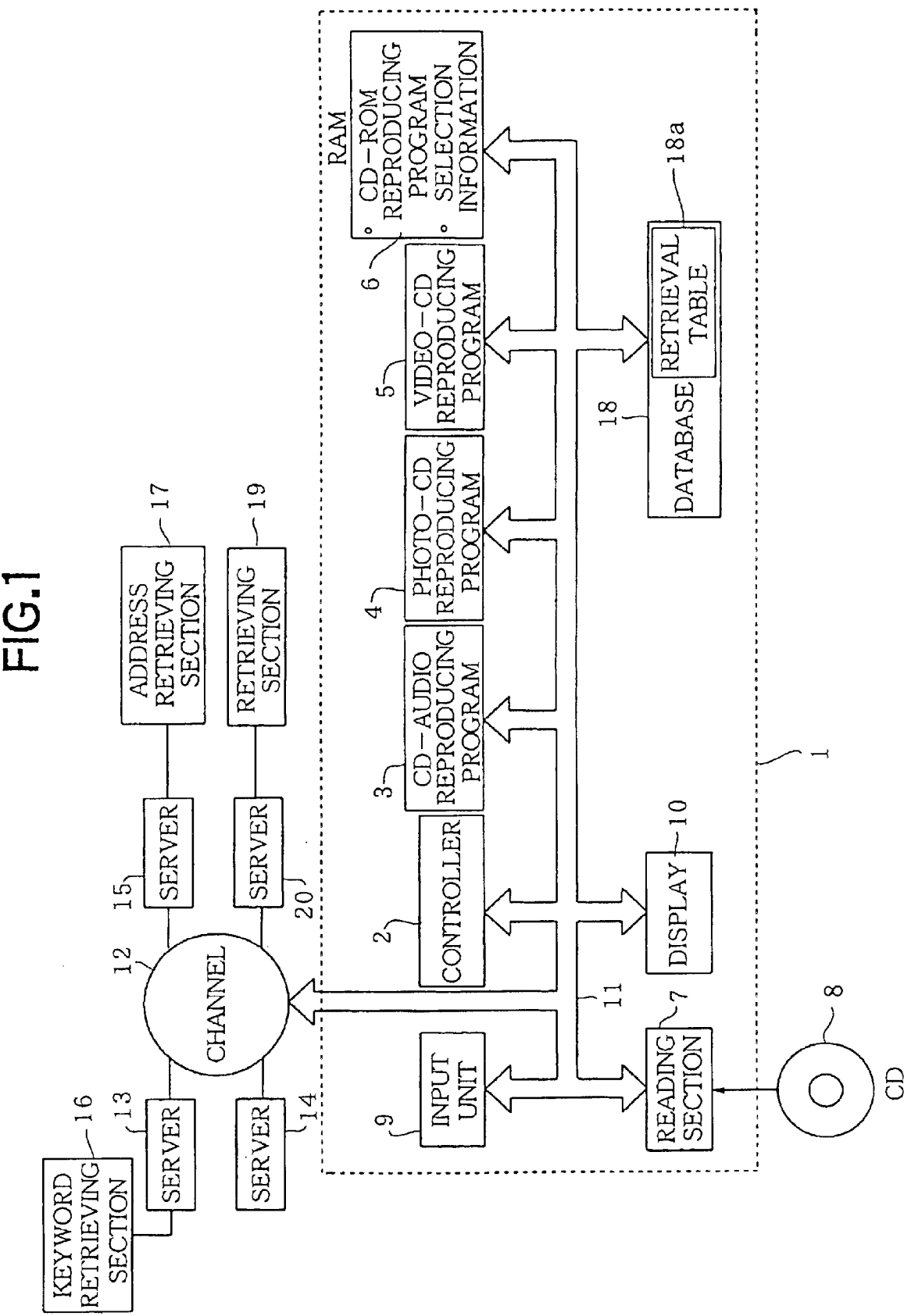
FIG. 1 is a block diagram showing a computer for a CD player according to the present invention.

Referring to FIG. 1, a computer 1 for a CD player according to the present invention has functions for automatically activating a reproducing program of a CD 8 set in the player and automatically calling related information of the CD.

The computer 1 comprises a controller 2, a reading section 7 for reading information recorded on the CD 8, an input unit 9 for manually inputting information, and a display 10 for displaying the information. The controller 2 has control programs at least such as an automatic activation program for automatically activating a reproducing program corresponding to the type of CD, a selection information deciding program for deciding priority reproduction of a session of the CD-extra, and an automatic calling program for automatically calling the related information of the CD. The reading section 7 has a hardware such as a pickup, and a driver for driving the pickup.

Furthermore, a plurality of programs such as CD-Audio reproducing program 3, photo-CD reproducing program 4 and video-CD reproducing program 5, a RAM 6 for storing the selection information and a CD-ROM reproducing program, and a database 18 having a retrieval table 18a are provided in the computer 1.

These elements are connected to each other through a bus-line 11. The bus-line 11 is further connected to an external communication channel 12 which is connected to servers 13, 14, 15 and 20.

Various operations of the computer 1 will be described hereinafter.

First, an automatic activating function of the reproducing program will be described with reference to the flowchart of FIG. 2. Such a function is operated by the automatic activating program of the controller 2.

At a step S1, when the CD 8 is set in the CD player, the controller 2 controls the reading section 7 to drive the CD 8 and read information (TOC information) recorded on a lead-in area of a first session (innermost session). Thus, the driver of the reading section 7 is operated to drive the pickup and motor to read the TOC information. The read information is produced.

At a step S2, the information such as control bit, address bit, minute, second, and frame number is obtained from the TOC information. The control bit is used to identify whether the first session is the one of a CD-Audio or the one of a CD-ROM. The address bit is used to identify whether the CD 8 has a single session (namely, only a first session is provided) or a multisession such as CD-extra.

At a step S3, the value of address bit is detected, and it is determined whether the CD 8 has the single session or the multisession by the address bit. If the CD 8 has the multisession, the program goes to a step S4. If the CD 8 has the single session, the program goes to a step S5.

At the step S4, since a start time of the next session is obtained by the TOC information, a lead-in area of a second session of the CD is read by the reading section 7. The program returns to steps S2 and S3. Thereafter, steps S4, S2 and S3 are repeated until the last session is read, and the program goes to the step S5.

The type of CD 8 is determined in accordance with the information in each session as described hereinafter.

At the step S5, it is determined whether the CD 8 is the CD-Audio or the CD-ROM by the control bit in the TOC. If the CD 8 is the CD-Audio, the program goes to a step S6. If the CD 8 is the CD-ROM, the program goes to a step S9.

Since the type of CD-Audio includes the CD-extra, the CD-extra is discriminated from the CD-Audio. Therefore, at the step S6, it is determined whether the CD-Audio has the single session or the multisession by the address bit in the TOC of the first session. If the CD-Audio has the single session, the CD-Audio is identified. The program goes to a step S7 where the CD-Audio reproducing program 3 is activated. Thus, a previously selected music (for example, first music) in the CD-audio is reproduced.

If the CD-Audio has the multisession at the step S6, the CD-extra is identified. The program goes to a step S8 where a CD-extra reproducing program is activated, which will be described hereinafter.

On the other hand, when the CD-ROM is determined at the step S5, since the CD-ROM includes the photo-CD and the video-CD, it is necessary to discriminate the type of CD-ROM. Therefore, at the step S9, it is determined whether the CD-ROM has the single session or the multisession by the address bit in the same manner as the step S6.

If the CD-ROM has the multisession, the CD-ROM is supposed as the photo-CD. The photo-CD is discriminated from the CD-ROM by a directory name. The program goes to a step S10 where the reading section 7 is operated to read a VTOC (Volume Table of Contents) in an LSN16 (physical address 00:02:16) of the last session. Since the VTOC comprises a PVD (Primary Volume Descriptor) which has a pointer for a root directory for the directory name, the VTOC is read. At a step S12, the directory name in the root directory is obtained.

If the CD-ROM has the single session at the step S9, the CD-ROM is supposed as the video-CD. Thus, as aforementioned, the video-CD is discriminated by the directory name. The program goes to a step S11 where a VTOC in an LSN16 of the first session is read by the reading section 7. At the step S12, the directory name in the root directory is obtained.

At a step S13, directory names in the respective root directories are retrieved.

If a directory name "VCD" is found out, the video-CD is identified. The program goes to a step S14 where the video-CD reproducing program 5 is activated.

If a directory name "PHOTO CD" is found out, the photo-CD is identified so that the program goes to a step S15 where the photo-CD reproducing program 4 is activated.

If neither "VCD" nor "PHOTO CD" is found out, the CD-ROM is identified. The program goes to a step S16 where a reproducing program stored in the set CD-ROM is stored in the RAM 6 and the program is activated. If there are a plurality of programs to be activated, one of them is activated in accordance with selected or predetermined priority by the user.

Thus, the operability of the computer is further improved.

The operation of the CD-extra at the step 8 will be described with reference to the flowchart of FIG. 3.

In order that the CD-extra can be reproduced by an ordinary CD player and the CD-extra can be used in a CD-ROM drive, an audio track of the CD-extra is provided in the first session, and a data track thereof is provided in the second session.

Heretofore, when the CD-ROM drive detects a multisession CD, the last session (namely, data track) a is read first. Since the CD player for music can not detect the multisession CD, the first session is read first.

In the embodiment, since it is possible to reproduce both of the music CD and the CD-ROM, it is more convenient for the user if one of the sessions of the CD-extra can be selected as priority reproduction. Therefore, for the activation of the CD-extra (step S8 of FIG. 2), steps S31 and S32 are added as shown in FIG. 3.

Figure 2:
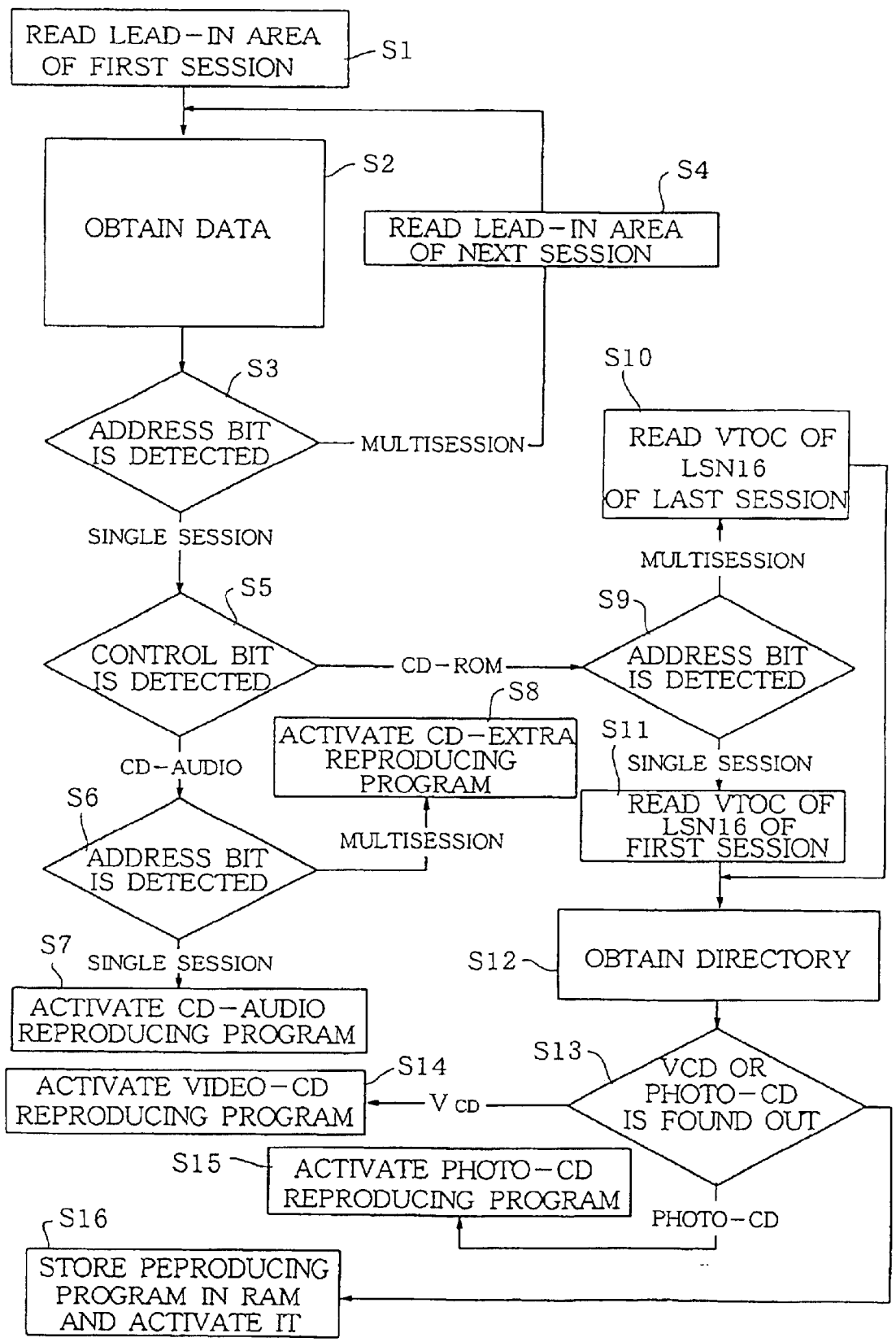
FIG. 2 is a flowchart showing an operation of a controller in the computer for automatically activating a reproducing program of a CD.
Figure 3:
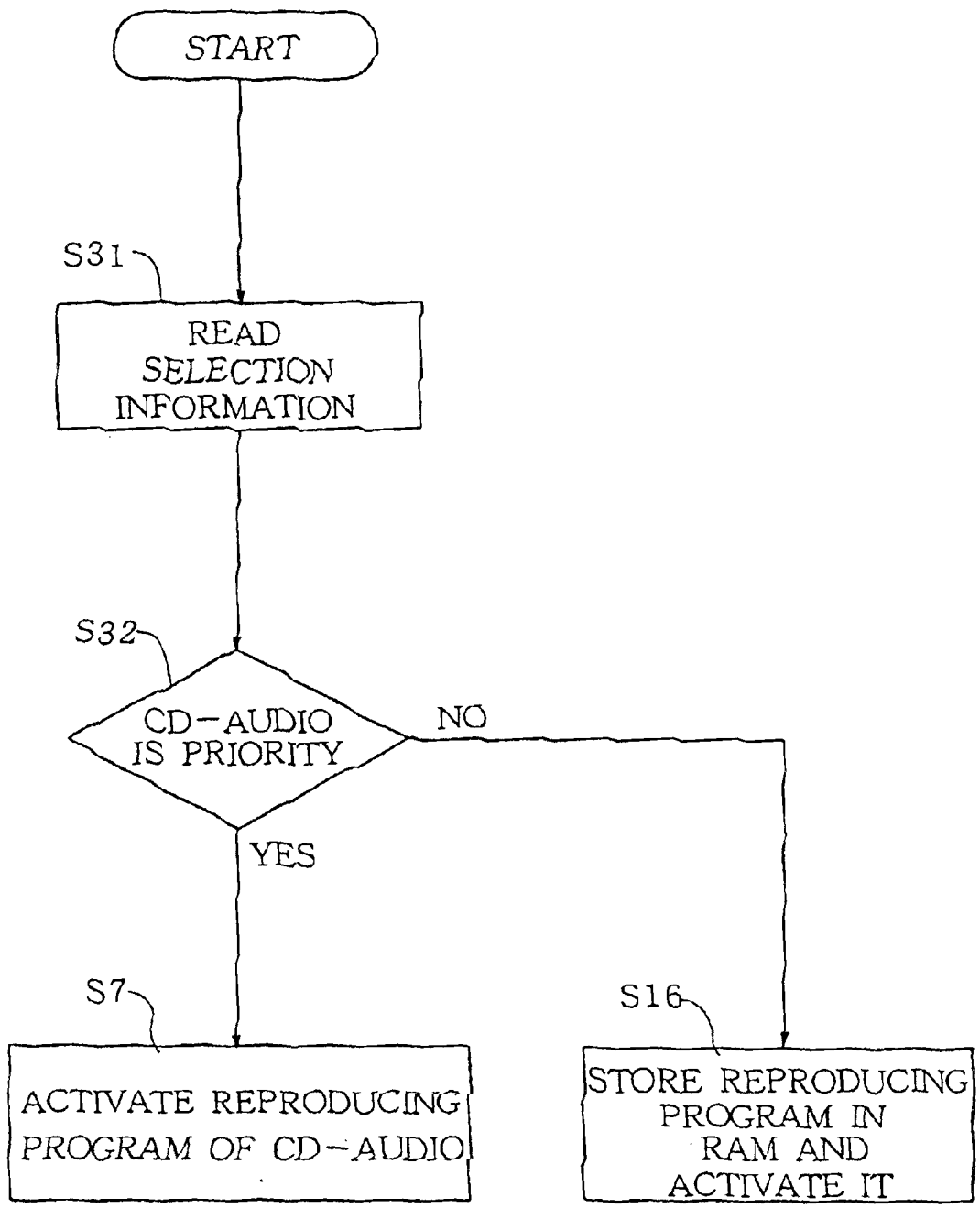
FIG. 3 is a flowchart showing an operation of the controller for selecting a session to be reproduced of a CD-extra.

Referring to FIG. 3, when the CD-extra is identified at the step S6 of FIG. 2, selection information stored in the RAM 6 is read at a step S31. The selection information instructs which session should be reproduced first. If the selection information is "1", priority reproduction of the audio session is instructed. If the selection information is "0", priority reproduction of the data session is instructed.

At a step S32, it is determined whether the selection information is the priority reproduction of the audio session or not. If yes, the CD-audio reproducing program 3 is activated in the same manner shown at the step S7 of FIG. 2. If not, the reproducing program stored in the CD-extra is stored in the RAM 6 and activated in the same manner shown at the step S16.

Thus, it is more convenient to reproduce the CD-extra.

Figure 4:
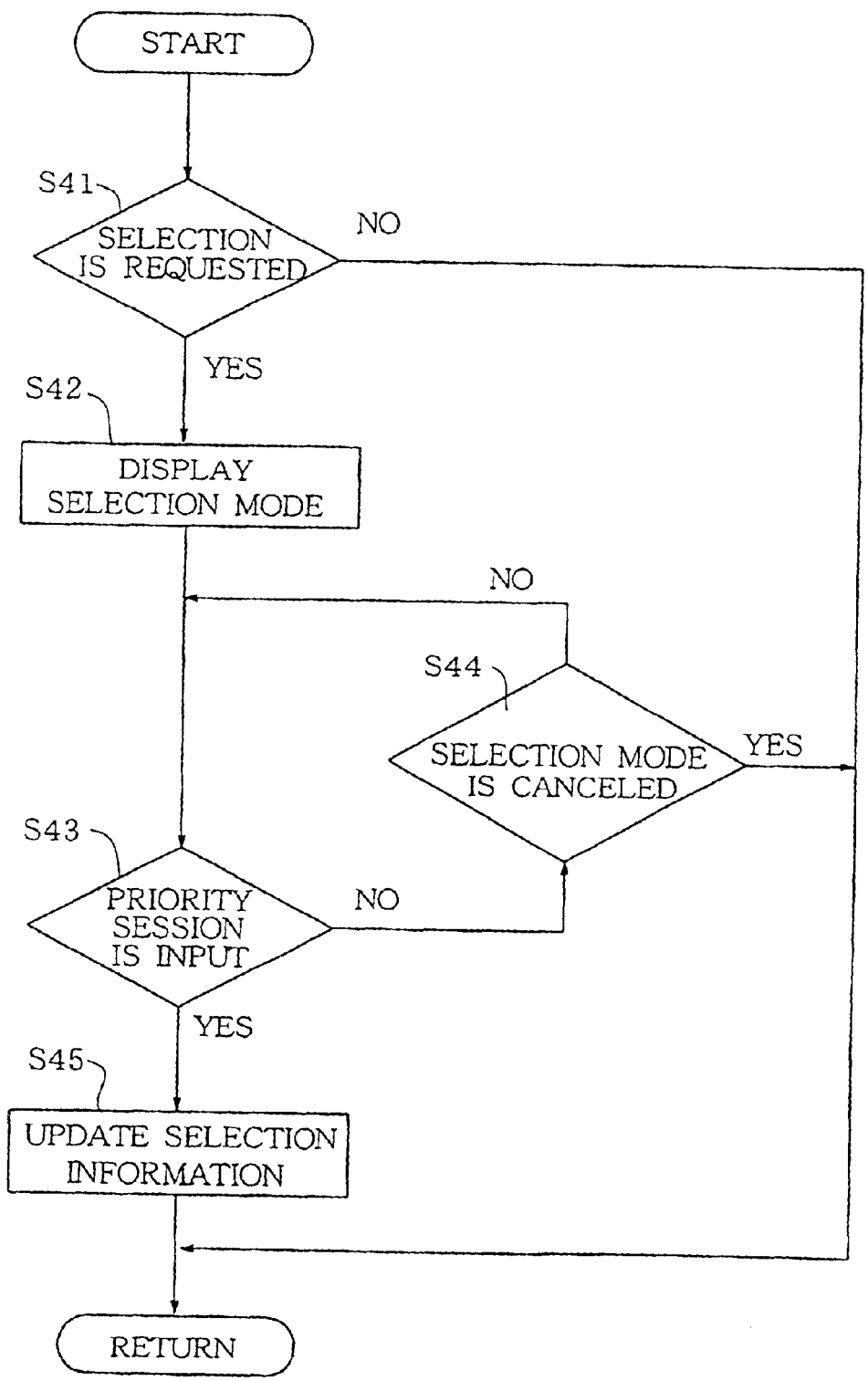
FIG. 4 is a flowchart showing another operation of the controller for deciding priority of a session to be reproduced of the CD-extra.

FIG. 4 shows an operation of the controller 2 for deciding the selection information of FIG. 3. The deciding program is periodically operated.

At a step S41, it is determined whether the selection is requested or not (for example, a selection request key on the display is clicked). If not, the program is terminated. If yes, the display 10 is operated to display a selection mode at a step S42.

At a step S43, it is determined whether priority session is input by the user or not. If yes, the program goes to a step S45 where the select information stored in the RAM 6 is updated based on the input.

If not at the step S43, the program goes to a step S44 where it is determined whether the selection mode is canceled or not. If not, the program goes to the step 543 which is repeated until the selection mode is canceled.

Thus, the user can select the priority reproduction of the session of the CD-extra at will.

Other than the CD-extra, a CD having multisession can also be used in the embodiment.

An automatic calling function of the related information of the CD will be described with reference to the flowchart of FIG. 5. Such a function is operated by the automatic calling program of the controller 2. The operation can be performed in parallel with the operation shown in FIG. 2.

As the related information of the CD, for example of the music CD, title of a music, list of songs, picture used on a jacket, words of song, home page of singer, and names of singer, writer, composer and player are stored.

At a step S51, it is determined whether the CD 8 is set or not. Namely, when the CD 8 is mounted on a disc tray of the reading section 7, the reading section 7 produces a detecting signal which is periodically detected by the controller 2. If yes, the program goes to a step S52. If not, the program is terminated.

At the step S52, identification information such as the TOC information and the type of CD is obtained. In the TOC information, information such as minute, second and frame number is used for identifying the CD. The information of the type of CD, which is described in FIG. 2, is used for retrieving data at a high speed.

At a step S53, data of the retrieval table 18a stored in the database 18 is retrieved for retrieving a keyword (for example, name of artist or title, if the CD 8 is the music CD) corresponding to the identification information.

FIG. 6 shows an example of the retrieval table 18a. Here, the table is made in accordance with the type of CD, thereby reducing work-load of the retrieval.

Furthermore, it is not necessary to correspond one piece of identification information to one keyword. For example, the identification information 1 may correspond to a plurality of keywords 1, 2, and reversely, a plurality pieces of identification information 2, 3 may correspond to the keyword 3.

The database 18 can be made by the user by manually inputting data, or obtained by other reproducing medium (for example, a CD which stores a database).

Furthermore, information on keyword can be stored in the CD. For example, a CD text of character information stored in a sub code can be used as a keyword. In this case, the process at the step S53 is omitted.

The server 13 has a keyword retrieving section 16 having a database larger than the database 18. The server 13 is accessed by the identification information, thereby obtaining keywords which are stored in order corresponding to the identification information. Thus, the database shown in FIG. 6 is made.

At a step S54, it is determined whether the keyword is obtained or not. If yes, the program goes to a step S55. If not, the program goes to a step S59.

At the step S55, an address of the keyword is retrieved.

FIG. 7 shows a retrieval table. As the table shown in FIG. 6, it is not necessary to correspond one keyword to one address. For example, the keyword 1 may correspond to a plurality of addresses 1, 2, and reversely, a plurality of keywords 2, 3 may correspond to the address 3.

As aforementioned, the database can also be made by the user by manually inputting data, or obtained by other reproducing medium. Furthermore, information on keyword can be stored in the set CD. In this case, the retrievals of keyword and address are omitted.

The server 15 having an address retrieving section 17 is accessed by the identification information, thereby obtaining addresses which are stored in order corresponding to the keywords. Thus, the database shown in FIG. 7 is made.

AT a step S56, it is determined whether the corresponding address is obtained or not. If yes, the program goes to a step S61 where the related information corresponding to the obtained address is displayed on the display 10.

The address is used as an address for the home page used in the Internet.

The related information such as a home page is obtained by accessing the server 14 for the retrieved address through the channel 12.

Furthermore, it is possible to obtain the related information of the corresponding address from a CD-ROM which stores the related information without using the network.

At the step S56, if the corresponding address is not obtained, the program goes to a step S57 where the display 10 is operated to display a request to the user for inputting an additional keyword.

Figure 8:
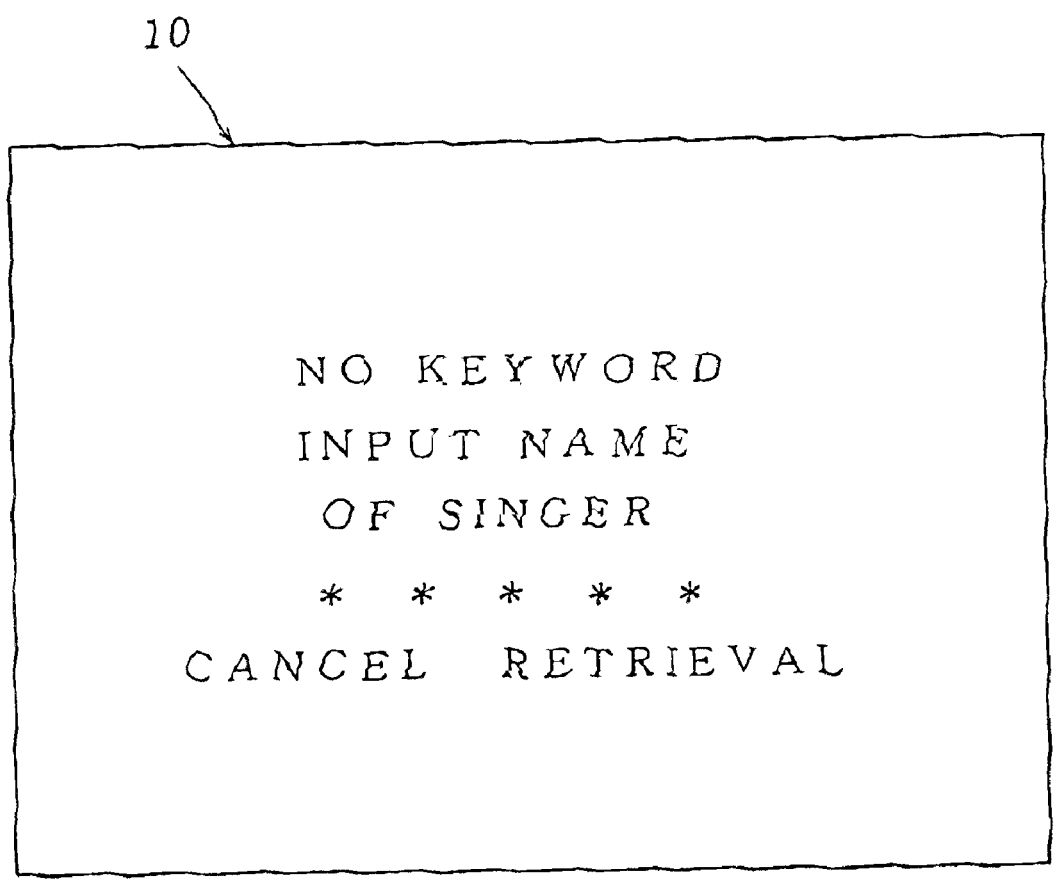
FIG. 8 is a diagram showing an example of information on a display.

FIG. 8 shows an example of information for the request on the display 10.

At a step S58, it is determined whether a data of additional keyword is input by the user or not. If yes, the program returned to the step S55. If a data of cancel is input, the program is terminated.

On the other hand, at the step S59, since the keyword is not obtained by the database, the server 13 having the keyword retrieving section 16 is accessed so as to transmit the identification information. The server 13 retrieves a corresponding keyword which is applied to the computer 1.

At a step S60, it is determined whether the corresponding keyword is obtained or not. If yes, the program goes to the step S55. If not, the program goes to the step S57.

Thus, it is possible to automatically display the related information.

In the embodiment, although the address is retrieved by the database 18, the address may be retrieved by the server 15 having the address retrieving section 17, as aforementioned. In this case, the computer 1 transmits the keyword to the server 15 for requesting the retrieval of the address.

If the keyword is retrieved by the database in the computer 1 at steps S53, S54, and if the address can not be obtained, the retrieval of the address is requested to the server 15 having the address retrieving section 17 for obtaining the corresponding address.

Furthermore, it is possible to retrieve the keyword only by the server 13 having the keyword retrieving section 16 without using the database 18. Alternatively, all of the keyword and the address can be retrieved by the servers 13 and 15. In the former case, the computer 1 transmits the identification information to the server 13 for requesting the retrieval of keyword. In the latter case, the computer 1 transmits the keyword to the server 15 for requesting the retrieval of address.

In the embodiment, the keyword is retrieved by the identification information, and the address is retrieved by the keyword. Thus, the general retrieval functions of the servers 13 and 15 can be easily used. As shown in FIG. 1, if a server 20 having a retrieving section 19 is provided for directly retrieving the address by the identification information, the address is directly retrieved without retrieving the keyword.

Figure 5:
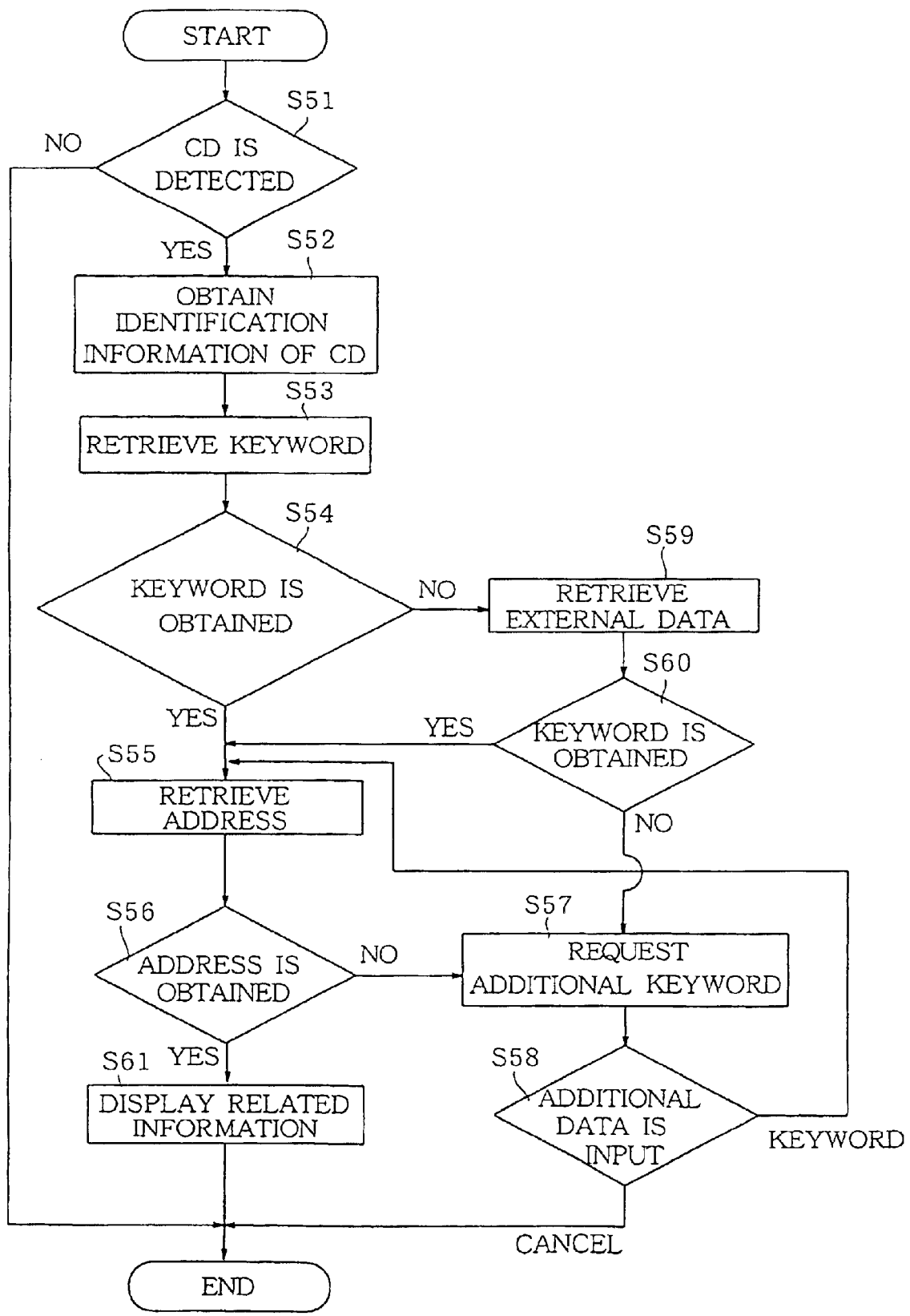
FIG. 5 is a flowchart showing an operation of the controller for automatically calling identification information of the CD.
Figure 9:
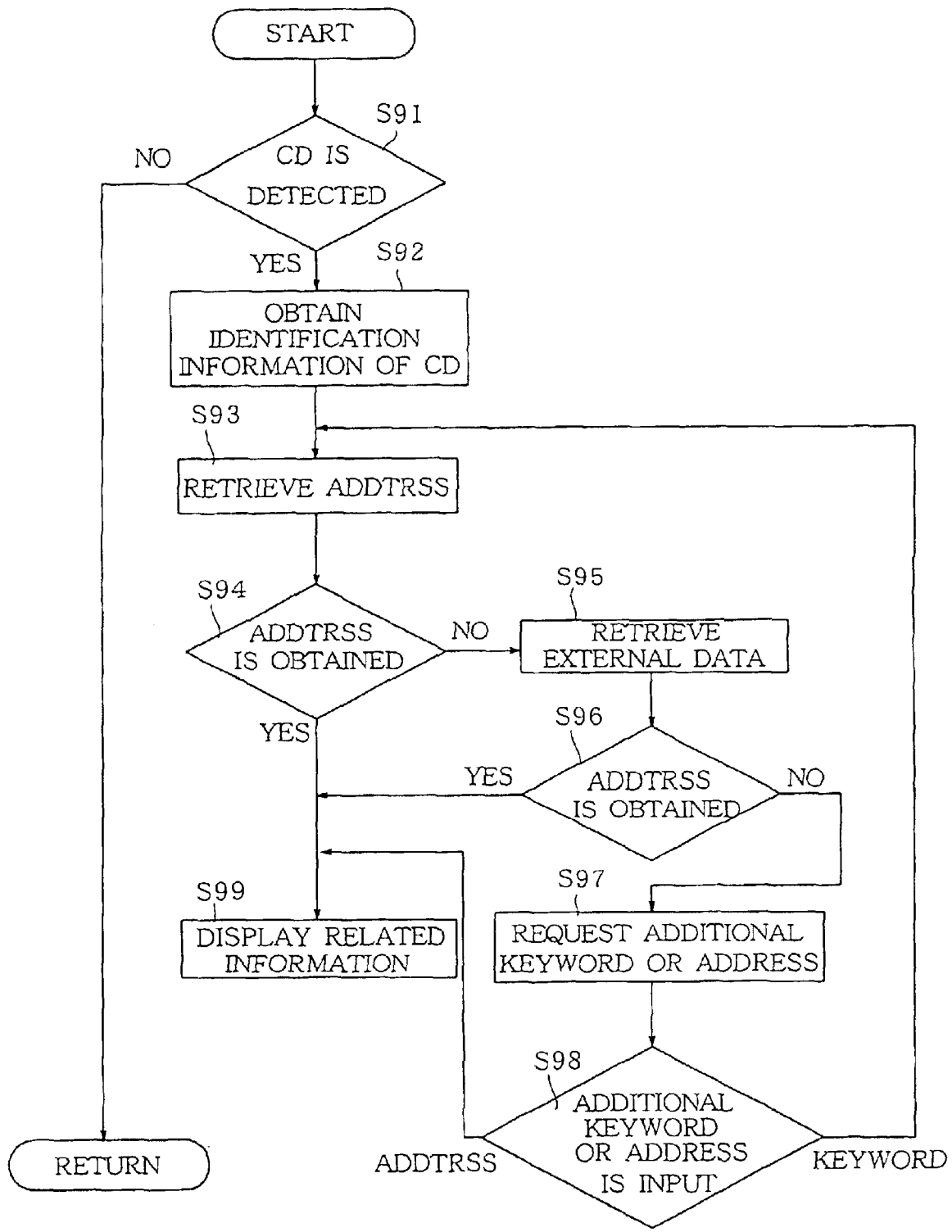
FIG. 9 is a flowchart showing another operation of the controller for automatically calling identification information of the CD.

FIG. 9 shows another embodiment of the automatic calling function of FIG. 5 in which the address is directly retrieved by the identification information. The operation may be performed in parallel with the operation shown in FIG. 2.

At a step S91, it is determined whether the CD 8 is set or not in the same manner as the step S51 of FIG. 5. If yes, the program goes to a step S92. If not, the program is terminated.

At the step S92, the identification information such as the TOC information and the type of CD is obtained in the same manner as the step S52 of FIG. 5.

At a step S93, data of the retrieval table 18a stored in the database 18 is retrieved for retrieving an address (for example, an address of the home page of the singer, if the identification information is for the music CD) corresponding to the identification information.

FIG. 10 shows a retrieval table. As aforementioned, the table is made in accordance with the type of CD, thereby reducing work-load of retrieval. Furthermore, it is not necessary to correspond one piece of identification information to one address. For example, the identification information 1 corresponds to a plurality of addresses 1, 2. Reversely, a plurality pieces of identification information 2, 3 correspond to the address 3.

As aforementioned, the database can be made by the user or obtained by other reproducing medium. It is also possible to further store the information on address in the other reproducing medium. In this case, the process at the step S93 is omitted.

The server 20 is accessed by the identification information, thereby obtaining addresses which are stored in order corresponding to the identification information. Thus, the database shown in FIG. 10 is made.

AT a step S94, it is determined whether the corresponding address is obtained or not. If yes, the program goes to a step S99 where the related information corresponding to the obtained address is displayed on the display 10.

In order to display the related information such as a home page, the browser program is activated to access the server 14 for the retrieved address through the channel 12. The obtained information is reformed to be displayed on the display.

As aforementioned, it is possible to obtain the related information corresponding to the address by the CD-ROM which stores the related information.

If the corresponding address is not obtained at the step S94, the program proceeds to a step S95 where the server 20 having the retrieving section 19 of a large database is accessed so as to transmit the identification information. The server 20 retrieves the corresponding address which is applied to the computer 1.

At a step S96, it is determined whether the corresponding address is obtained or not. If the address is obtained, the program proceeds to the step S99.

If not, the program proceeds to a step S97 where the display 10 is operated to display a request to the user for inputting an additional keyword or address.

At a step S98, it is determined whether a keyword or address is input by the user or not. If the keyword is input, the program is returned to the step S93. If the address is input, the program proceeds to the step S99.

Thus, the related information can be automatically displayed.

It is possible to retrieve the address only by the server 20 having the retrieving section 19 without using the database of the computer.

In place of the CD, other reproducing medium such as a DVD may be used.

In accordance with the present invention, when the CD is set on the player of the computer, the related information of the CD is automatically obtained. Consequently, it is possible to increase the operability of the computer.

While the invention has been described in conjunction with preferred specific embodiment thereof, it will be understood that this description is intended to illustrate and not limit the scope of the invention, which is defined by the following claims.

What is claimed is:

1. An information acquisition apparatus for reproducing information stored in an information recording medium, and for communicating with at least one information server as a database of related information related to the information recording medium through an Internet, comprising:

reading means for automatically initiating reading of one or more music as contents information and predetermined address information when the information recording medium is set into the information acquisition apparatus, in which said music and said predetermined address information indicating an address of a homepage provided in the information server are stored on the information recording medium beforehand;

reproducing means for reproducing said music being read by said reading means;

address-information acquisition means processing for acquiring said predetermined address information to obtain the related information for the set information recording medium from said reading means in parallel with music reproduction initiated by said reproducing means; and related-information acquisition means processing for accessing the homepage of the information server through the Internet based on said address information acquired by said address-information acquisition means in parallel with said music reproduction initiated by said reproducing means, and for acquiring any of said related information such as a list of music title, a lyric, a name of singer, a homepage of the singer, a name of lyricist, a name of composer, names of players, a title of the information recording medium, and a picture of jacket of the information recording medium;

display control means processing for displaying said related information acquired by said related-information acquisition means; and control means for processing each of said address-information acquisition means, said related-information acquisition means, and said display control means in parallel with said music reproduction processed by said reproducing means.

2. An information acquisition method for reproducing information stored in an information recording medium, and for communicating with at least one information server as a database of related information related to the information recording medium through an Internet, comprising the steps of:

initiating reading of one or more music as contents information and predetermined address information automatically when the information recording medium is set into the information acquisition apparatus, in which said music and said predetermined address information indicating an address of a homepage provided in the information server are stored on the information recording medium beforehand;

reproducing said music after said reading step;

acquiring said predetermined address information to obtain the related information for the set information recording medium from the information read in said reading step in parallel with music reproduction in said reproducing step;

accessing the homepage through the Internet based on said address information acquired in said address-information acquisition step in parallel with said music reproduction in said reproducing step;

acquiring any of said related information such as a list of music title, a lyric, a name of singer, a homepage of the singer, a name of lyricist, a name of composer, names of players, a title of the information recording medium, and a picture of jacket of the information recording medium in parallel with said music reproduction in said reproducing step; and displaying said related information acquired by said related information acquiring step in parallel with said music reproduction in said reproducing step.

3. An information acquisition method using an information acquisition apparatus for reproducing information stored in an information recording medium, and for communicating with at least one information server as a database of related information related to the information recording medium through an Internet, comprising the steps of:

initiating reading of one or more music as contents information and predetermined address information automatically when the information recording medium is set into the information acquisition apparatus, in which said music and said predetermined address information indicating an address of a homepage provided in the information server are stored on the information recording medium beforehand;

reproducing said music after said reading step;

acquiring said predetermined address information to obtain the related information for the set information recording medium from the information read in said reading step in parallel with music reproduction in said reproducing step;

accessing the homepage through the Internet based on said address information acquired in said address-information acquisition step in parallel with said music reproduction in said reproducing step;

acquiring any of said related information such as a list of music title, a lyric, a name of singer, a homepage of the singer, a name of lyricist, a name of composer, names of players, a title of the information recording medium, and a picture of jacket of the information recording medium in parallel with said music reproduction in said reproducing step; and displaying said related information acquired by said related information acquiring step in parallel with said music reproduction in said reproducing step.

4. An information acquisition apparatus for reproducing information stored in an information recording medium, and for communicating with at least one information server as a database of related information related to the information recording medium through an Internet, comprising:

a reading unit for automatically initiating reading of one or more music as contents information and predetermined address information when the information recording medium is set into the information acquisition apparatus, in which said music and said predetermined address information indicating an address of a homepage provided in the information server are stored on the information recording medium beforehand;

a reproducing unit for reproducing said music being read by said reading unit;

an address-information acquisition unit processing for acquiring said predetermined address information to obtain the related information for the set information recording medium from said reading unfit in parallel with music reproduction initiated by said reproducing unit; and a related-information acquisition unit processing for accessing the homepage of the information server through the Internet based on said address information acquired by said address-information acquisition unit in parallel with said music reproduction initiated by said reproducing unit, and for acquiring any of said related information such as a list of music title, a lyric, a name of singer, a homepage of the singer, a name of lyricist, a name of composer, names of players, a title of the information recording medium, and a picture of jacket of the information recording medium;

a display control unit processing for displaying said related information acquired by said related-information acquisition unit; and a control unit; for processing each of said address-information acquisition unit, said related-information acquisition unit, and said display control unit in parallel, with said music reproduction processed by said reproducing unit.

* * * * *